United States Patent
Drolet et al.

(10) Patent No.: US 11,667,392 B2
(45) Date of Patent: Jun. 6, 2023

(54) METHOD AND SYSTEM FOR OPERATING A ROTORCRAFT ENGINE

(71) Applicant: PRATT & WHITNEY CANADA CORP., Longueuil (CA)

(72) Inventors: Martin Drolet, Saint-Amable (CA); Sylvain Desnoyers, St-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 976 days.

(21) Appl. No.: 16/447,187

(22) Filed: Jun. 20, 2019

(65) Prior Publication Data

US 2020/0398993 A1     Dec. 24, 2020

(51) Int. Cl.
| | |
|---|---|
| *B64D 31/00* | (2006.01) |
| *G01L 5/13* | (2006.01) |
| *G01K 13/02* | (2021.01) |
| *B64D 33/02* | (2006.01) |

(52) U.S. Cl.
CPC ............ *B64D 31/00* (2013.01); *G01K 13/02* (2013.01); *G01L 5/133* (2013.01); *B64D 33/02* (2013.01); *B64D 2033/0253* (2013.01); *G01K 2205/02* (2013.01)

(58) Field of Classification Search
CPC .......... F05D 2260/82; F05D 2260/821; F05D 2260/80; F05D 2260/81; F05D 2270/335; F05D 2270/71; F05D 2270/44
See application file for complete search history.

(56) References Cited

U.S. PATENT DOCUMENTS

| | | | |
|---|---|---|---|
| 3,927,307 A | 12/1975 | Reschak | |
| 4,159,642 A | 7/1979 | Hudson et al. | |
| 4,467,640 A | 8/1984 | Morrison | |
| 4,538,777 A | 9/1985 | Hall | |
| 5,394,689 A | 3/1995 | D'Onofrio | |
| 6,520,286 B1 | 2/2003 | Frederiksen et al. | |
| 7,248,009 B1 | 7/2007 | Sundquist | |
| 7,254,477 B1 * | 8/2007 | Banks ................... | G01M 15/09 701/115 |
| 7,660,649 B1 | 2/2010 | Hope et al. | |
| 7,840,395 B2 | 11/2010 | Nasle et al. | |
| 7,863,867 B2 | 1/2011 | Ganev et al. | |
| 8,058,850 B2 | 11/2011 | Ganev et al. | |
| 8,068,997 B2 | 11/2011 | Ling et al. | |

(Continued)

FOREIGN PATENT DOCUMENTS

| | | |
|---|---|---|
| CN | 202944566 U | 5/2013 |
| CN | 103267644 A | 8/2013 |

(Continued)

*Primary Examiner* — Herbert K Roberts
(74) *Attorney, Agent, or Firm* — Norton Rose Fulbright Canada LLP

(57) ABSTRACT

Systems and methods for operating a rotorcraft engine are described herein. Measurements indicative of at least one of current temperature and current pressure at an inlet of the engine are obtained from at least one sensor while the rotorcraft is in flight. At least one current inlet loss is determined from the measurements. Current available engine power of the rotorcraft engine is determined based on the at least one current inlet losses. A visual indication of the current available engine power is produced via a flight display.

20 Claims, 9 Drawing Sheets

(56) References Cited

U.S. PATENT DOCUMENTS

| | | | |
|---|---|---|---|
| 8,321,118 | B2 | 11/2012 | Moeckly et al. |
| 8,666,568 | B2 | 3/2014 | Camhi |
| 8,918,235 | B1 | 12/2014 | Eggold et al. |
| 9,193,450 | B2 | 11/2015 | Worsham, II et al. |
| 9,355,571 | B2 | 5/2016 | Rucci et al. |
| 9,666,051 | B2 | 5/2017 | Rossotto et al. |
| 9,889,944 | B2 | 2/2018 | Schmidt |
| 9,890,708 | B2 | 2/2018 | Borchers et al. |
| 10,005,561 | B2 | 6/2018 | Kiebles et al. |
| 10,048,168 | B2 | 8/2018 | Armstrong et al. |
| 10,054,499 | B2 | 8/2018 | Karunaratne et al. |
| 10,107,203 | B2 | 10/2018 | Karpman et al. |
| 2008/0125931 | A1* | 5/2008 | Gaulmin ............ G01D 1/18 702/183 |
| 2009/0173078 | A1* | 7/2009 | Thatcher ............ F02C 9/20 60/773 |
| 2010/0095681 | A1* | 4/2010 | Enis ............ F02C 7/143 165/104.19 |
| 2010/0161197 | A1* | 6/2010 | Moeckly ............ G05B 23/0254 701/99 |
| 2010/0204931 | A1* | 8/2010 | Ling ............ G05B 23/0283 702/41 |
| 2013/0199204 | A1* | 8/2013 | Camhi ............ G05B 23/0221 60/779 |
| 2014/0156165 | A1* | 6/2014 | Ewens ............ F02C 9/20 701/100 |
| 2016/0035203 | A1* | 2/2016 | Rossotto ............ G08B 19/02 701/36 |
| 2016/0305342 | A1* | 10/2016 | Morgan ............ F02C 9/28 |
| 2016/0347479 | A1 | 12/2016 | O'Neil et al. |
| 2016/0368612 | A1* | 12/2016 | Xiong ............ G07C 5/0816 |
| 2017/0175651 | A1* | 6/2017 | Davis, Jr. ............ G05B 15/02 |
| 2017/0350271 | A1* | 12/2017 | Ewens ............ G05B 23/0254 |
| 2018/0025557 | A1 | 1/2018 | Steinert |
| 2018/0030904 | A1 | 2/2018 | Meunier |
| 2018/0065738 | A1 | 3/2018 | Lappos et al. |
| 2020/0173360 | A1* | 6/2020 | Wifling ............ F02C 9/20 |
| 2021/0108578 | A1* | 4/2021 | Darfeuil ............ F02C 6/20 |

FOREIGN PATENT DOCUMENTS

| | | |
|---|---|---|
| CN | 203681369 U | 7/2014 |
| CN | 103366078 B | 8/2017 |
| CN | 109141418 A | 1/2019 |
| CN | 104408243 B | 2/2019 |

* cited by examiner

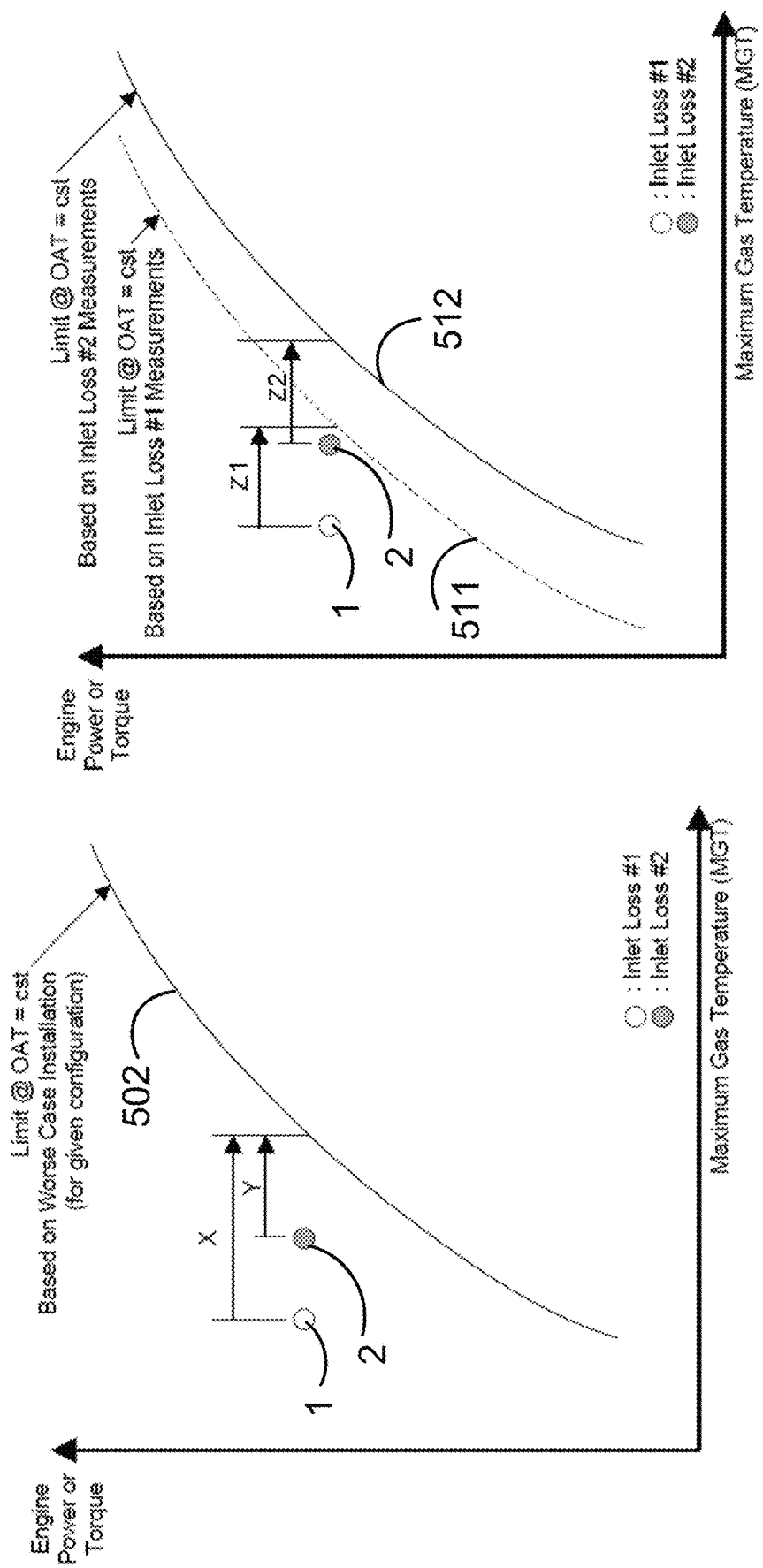

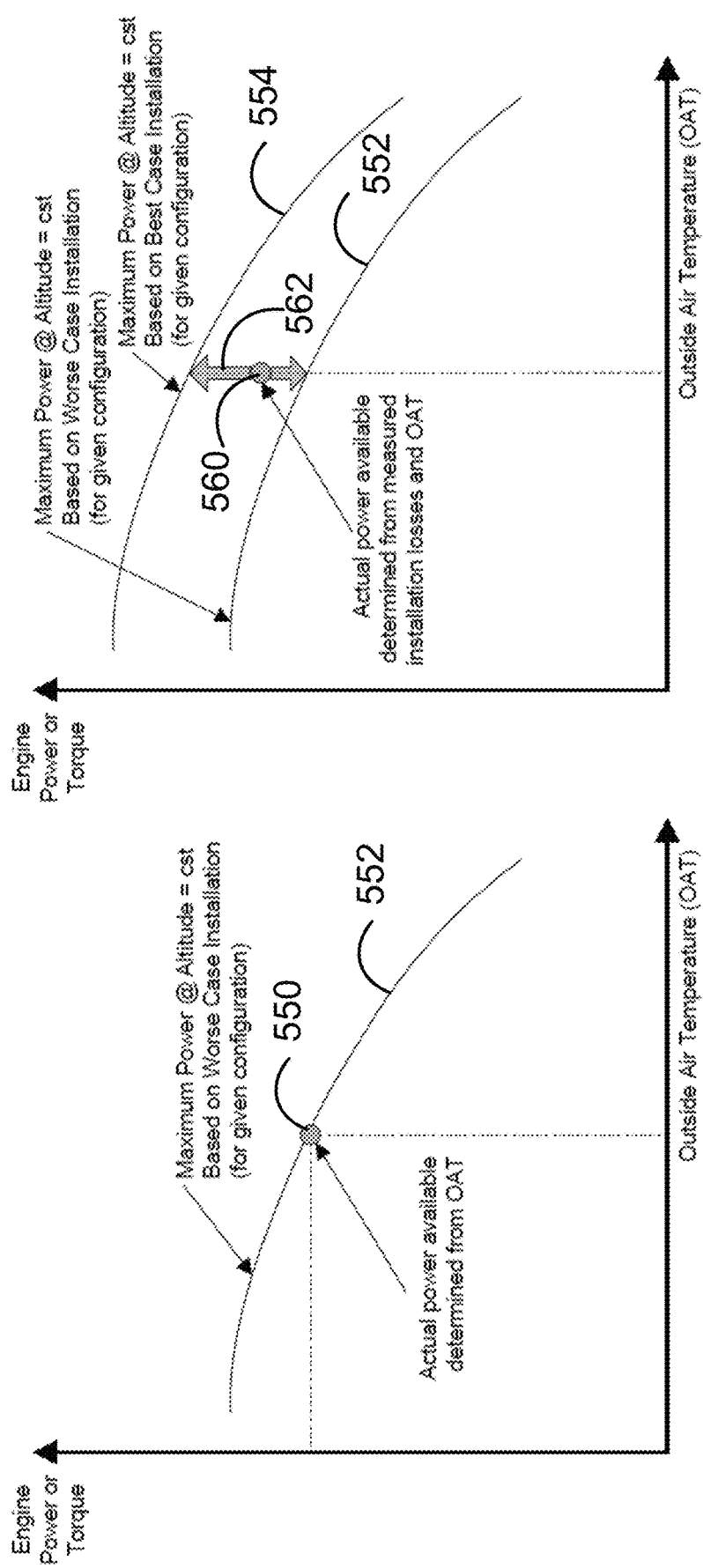

METHOD AND SYSTEM FOR OPERATING A ROTORCRAFT ENGINE

TECHNICAL FIELD

The present disclosure relates generally to rotorcraft engines, and, more particularly, to operating rotorcraft engines.

BACKGROUND OF THE ART

The available engine power of a rotorcraft engine is typically determined taking into account installation losses (e.g., pressure losses or charge heating) that are determined at the time of installation. These installation losses depend on the installation of the engine in the rotorcraft and typically reflect a worst case scenario.

As such, there is a need for improvement.

SUMMARY

In one aspect, there is provided a method for operating a rotorcraft engine. The method comprises obtaining measurements indicative of at least one of current temperature and current pressure at an inlet of the engine from at least one sensor while the rotorcraft is in flight, determining at least one current inlet loss from the measurements, determining current available engine power of the rotorcraft engine based on the at least one current inlet loss, and producing, via a flight display, a visual indication of the current available engine power.

In one aspect, there is provided a system for operating a rotorcraft engine. The system comprises at least one processing unit and a non-transitory computer-readable memory having stored thereon program instructions. The program instructions are executable by the at least one processing unit for obtaining measurements indicative of at least one of current temperature and current pressure at an inlet of the engine from at least one sensor while the rotorcraft is in flight, determining at least one current inlet loss from the measurements, determining current available engine power of the rotorcraft engine based on the at least one current inlet loss, and producing, via a flight display, a visual indication of the current available engine power.

DESCRIPTION OF THE DRAWINGS

Reference is now made to the accompanying figures in which:

FIGS. 5A and 5B are graphs that respectively illustrate engine power assurance check limits when predetermined losses and actively determined losses are used, in accordance with one or more embodiments;

FIGS. 6A and 6B are graphs that respectively illustrate current available engine power when predetermined losses and actively determined losses are used, in accordance with one or more embodiments.

It will be noted that throughout the appended drawings, like features are identified by like reference numerals.

DETAILED DESCRIPTION

The present disclosure is generally drawn to systems and methods for operating a rotorcraft engine. Current available engine power is determined based on current inlet losses that are determined from measurements taken inflight at one or more inlets of the engine. A visual indication of the current available engine power is generated for display on a flight display, thereby allowing an operator of the rotorcraft to accordingly operate the engine and the rotorcraft.

Figure 1A:
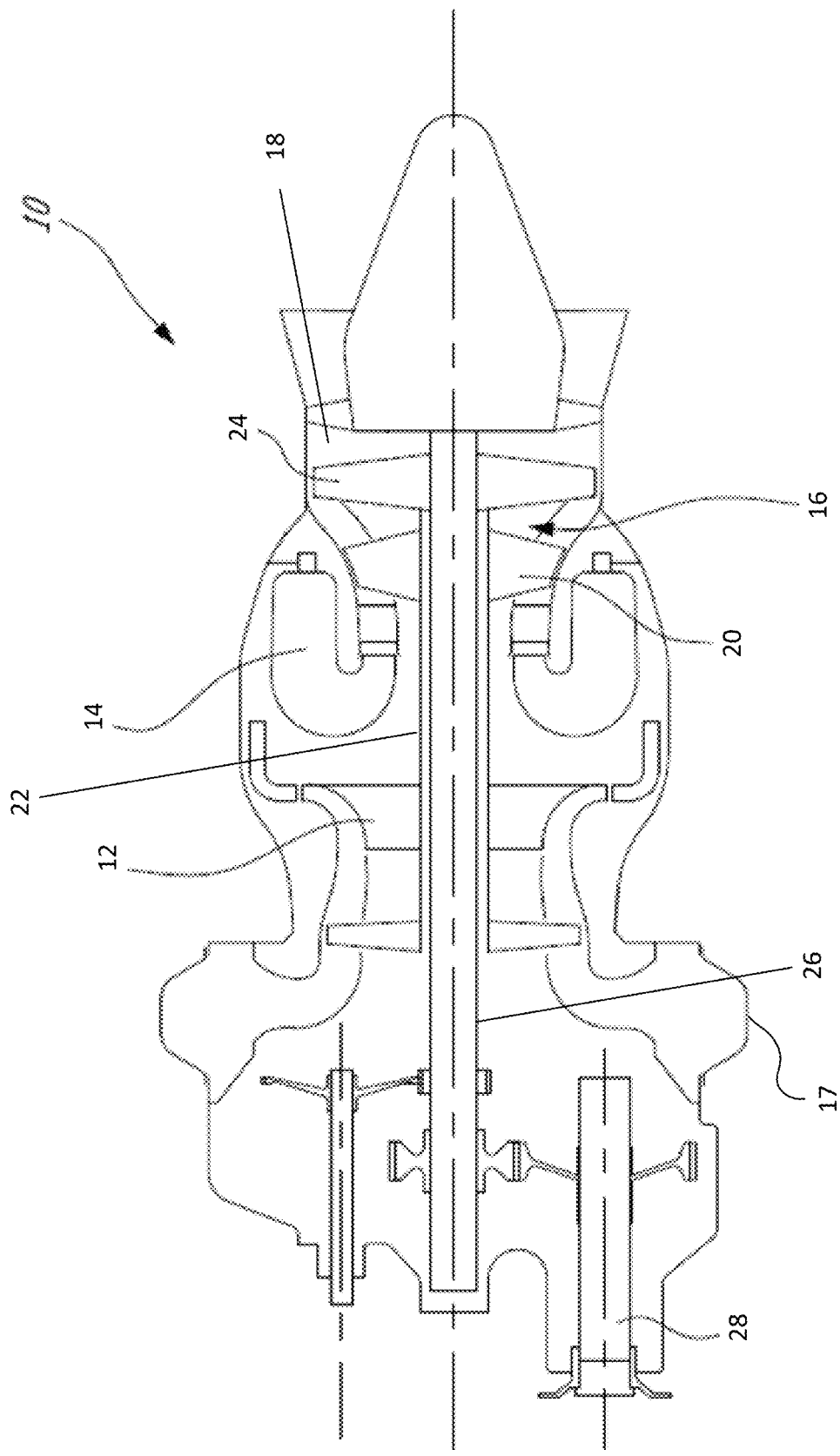
FIG. 1A is a schematic of an example gas turbine engine, in accordance with one or more embodiments.

FIG. 1A illustrates a gas turbine engine 10 of a type that may be provided for use in flight, generally comprising in serial flow communication a compressor section 12 for pressurizing the air, a combustor 14 in which the compressed air is mixed with fuel and ignited for generating an annular stream of hot combustion gases, and a turbine section 16 for extracting energy from the combustion gases. The engine 10 comprises at least one air inlet 17 via which air enters the engine 10 before being directed into the compressor section 12. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28, which may be through a reduction gearbox (not illustrated). It should be understood that while the engine 10 is a turboshaft engine, the methods and systems described herein may be applicable to any other suitable type of gas turbine engine.

Figure 1B:
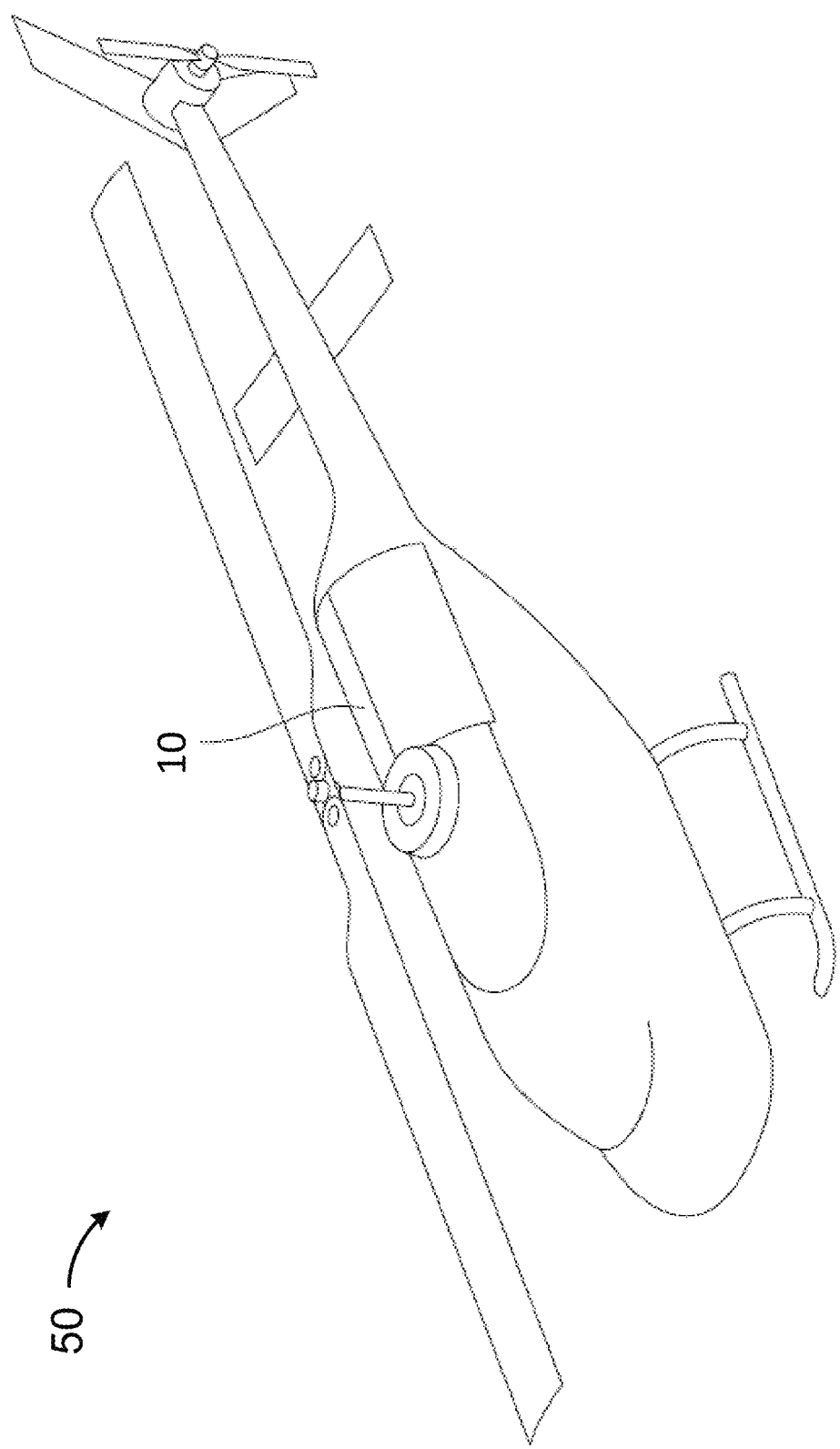
FIG. 1B is a schematic of a rotorcraft, in accordance with one or more embodiments.

FIG. 1B illustrates an exemplary rotorcraft 50, which in this case is a helicopter. The rotorcraft 50 comprises one or more engines, such as the engine 10. When the engine 10 is installed in the rotorcraft 50, the installation configuration may result in installation loss characteristics that affect the maximum available output power of the engine 10. For example, the engine 10 can be installed in the rotorcraft 50 with a standard inlet and exhaust. By way of another example, the engine 10 can be installed with inlet barrier filters (IBFs) associated with the engine air inlet(s) 17 to filter particulate matter from air fed to the engine 10 and a corresponding exhaust. By way of yet another example, the engine 10 can be installed in the rotorcraft 50 with an inertial particle separator (IPS) associated with the engine air inlet(s) 17 and a corresponding exhaust. Each of these installation configurations have unique installation loss characteristics (e.g., pressure losses, charge heating and/or others). The installation configuration and corresponding installation loss characteristics may vary depending on practical implementations. The installation loss characteristics may be determined during the rotorcraft development and/or certification phase and may be stored in a control system of the engine 10 and/or rotorcraft 50 as predetermined installation loss characteristics.

Figure 2:
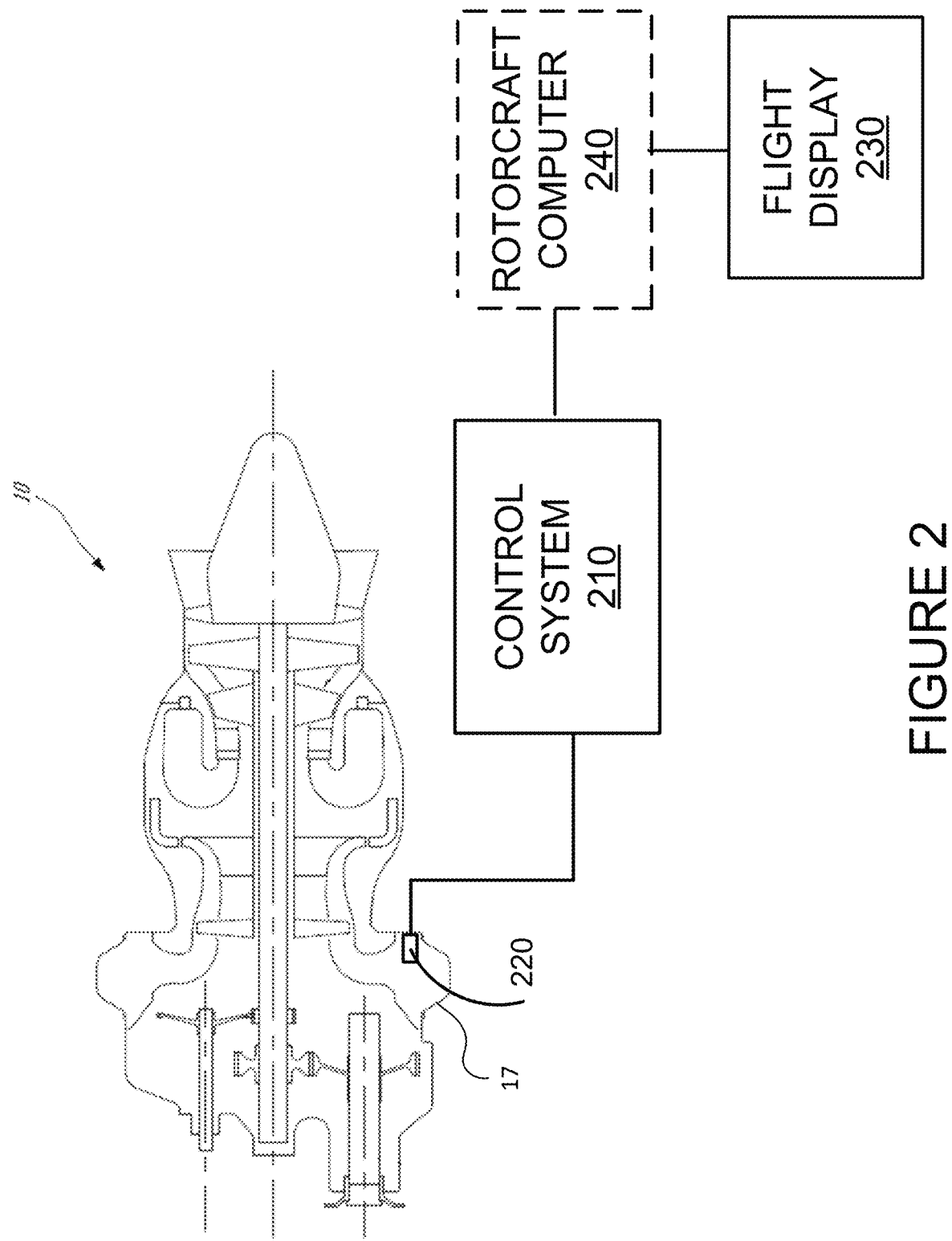
FIG. 2 is a block diagram of a system for operating a rotorcraft engine, in accordance with one or more embodiments.

FIG. 2 illustrates a control system 210 for operating a rotorcraft engine, such as the engine 10. The control system 210 is configured to determine one or more current inlet losses from measurements obtained from at least one sensor 220 operatively coupled to the engine 10, determine current available engine power of the engine 10 based on the current inlet losses, and produce, via a flight display 230, a visual indication of the current available engine power. The control system 210 may output a signal indicative of the current available engine power to the flight display 230 or may output the signal to a rotorcraft computer 240 which causes the flight display 230 to display a visual indication of the current available engine power. In some embodiments, the current available engine power corresponds to a maximum output power of the engine 10. In some embodiments, the current available engine power corresponds to a power margin indicative of the difference between the current output power of the engine 10 and the maximum available output power of the engine 10. The power margin may be a percentage representing the current available engine power determined based on a difference between the current output power of the engine 10 and the maximum available output power. While the control system 210 is illustrated as separate from the engine 10, it should be understood that this is for illustrative purposes only and that the control system 210 may, in some embodiments, be integrated with the engine 10 or with the rotorcraft computer 240.

The sensor 220 is positioned inside the inlet 17 of the engine 10 and obtains measurements indicative of at least temperature or pressure at the inlet 17. The sensor 220 may be a pre-existing sensor found on the engine 10. Alternatively, the sensor 220 may be a sensor added for the purposes of implementing one or more embodiments described herein. In some embodiments, at least one pre-existing sensor and an additional sensor added for the purposes of implementing one or more embodiments described herein are used. The sensor(s) 220 may comprise an inlet temperature sensor for obtaining temperature at the inlet 17, an inlet pressure sensor for obtaining pressure at the inlet 17 and/or any other suitable sensor. Accordingly, the measurements obtained may comprise current inlet temperature, current inlet pressure and/or any other suitable measurement. The sensor 220 provides the measurements to the control system 210.

The control system 210 is configured to determine the current inlet losses from the measurements obtained by the sensor 220. The measurements from the sensor 220 may be continuously received (i.e., in real-time, or near real-time) and/or may be received in accordance with any suitable regular or irregular time interval. The measurements from the sensor 220 may be received when requested by the control system 210. The current inlet losses may vary with time. Accordingly, the current inlet losses correspond to a current state of the inlet losses, as the control system 210 is able to determine the current inlet losses in real-time, in near real-time, or whenever the inlet losses are needed. The determined inlet losses may comprise a charge heating, an inlet pressure loss and/or any other suitable inlet loss. Charge heating refers to a temperature change at an engine inlet and as such corresponds to an inlet temperature loss. The control system 210 is configured to determine the current available engine power based on the current inlet losses. Accordingly, the current available engine power corresponds to a current state of the available engine power, as the control system 210 is able to determine the current available engine power in real-time, in near real-time, or whenever the available engine power is needed based on the current inlet losses.

The flight display 230 may receive the signal indicative of the current available engine power and display a visual indication of the current available engine power. The rotorcraft computer 240 may receive and process the signal indicative of the current available engine power, in order to cause a visual indication of the current available engine power to be displayed on the flight display 230. In some embodiments, the visual indication of the current available engine power is continuously displayed while the rotorcraft 50 is inflight. In some embodiments, the visual indication of the current available engine power is determined and displayed in response to an engine power assurance check (EPAC). The flight display 230 may comprise an aircraft gauge, electronic flight instrumentation, a display screen (e.g., cathode ray tube display screen, light-emitting diode display screen, liquid crystal display screen or any other suitable display screen), a touch screen, and/or any other suitable output mechanisms for providing a visual indicator to an operator of the rotorcraft 50.

Figure 3:
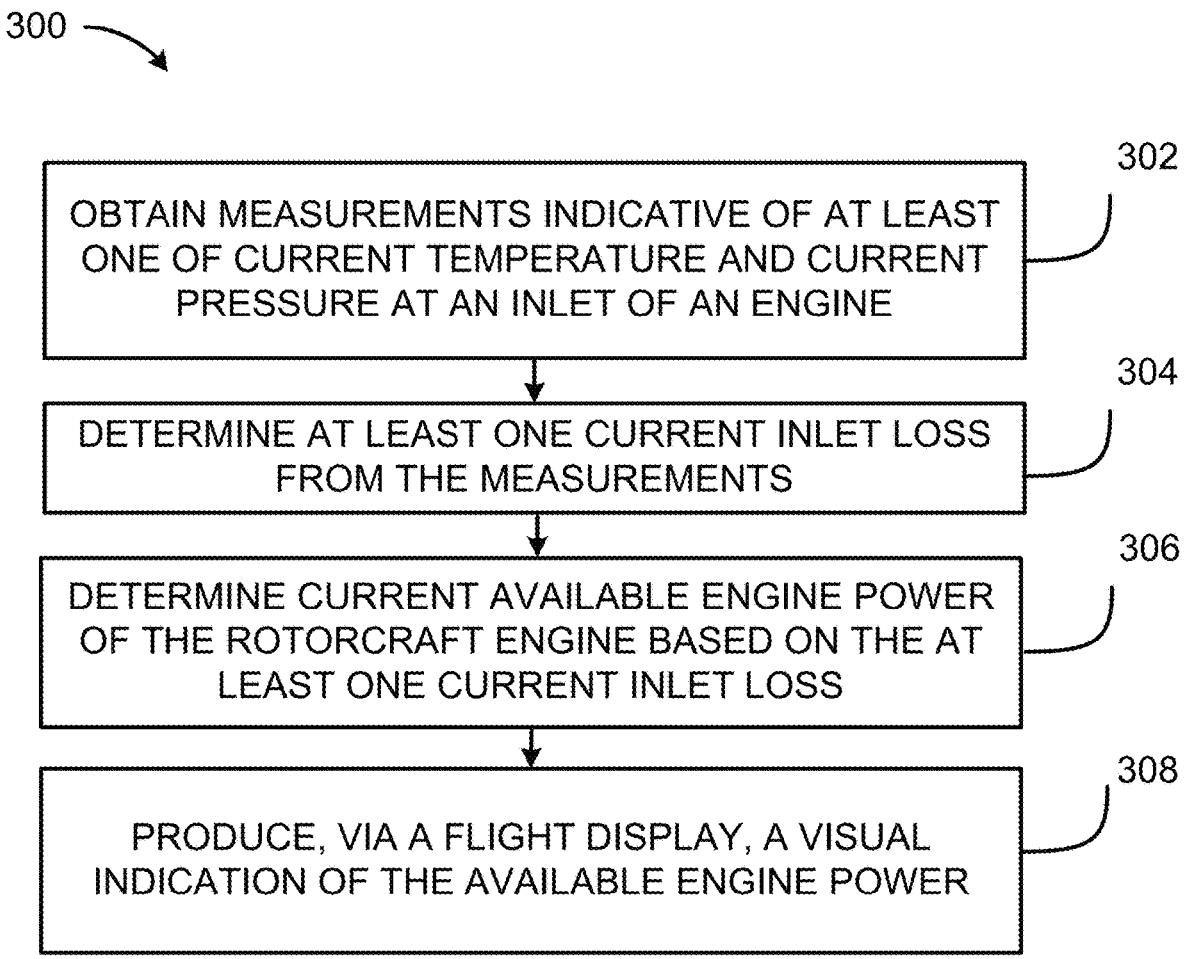
FIG. 3 is a flowchart of an example method for operating a rotorcraft engine, in accordance with one or more embodiments.

With reference to FIG. 3, there is illustrated a flowchart of a method 300 for operating a rotorcraft engine, such as engine 10 of the rotorcraft 50. The method 300 may be performed by the control system 210. At step 302, measurements are obtained indicative of at least one of current temperature and current pressure at an inlet 17 of the engine 10. The measurements are obtained from at least one sensor 220 while the rotorcraft 50 is inflight. The measurements may comprise current inlet temperature, current inlet pressure and/or any other suitable measurement. At step 304, at least one current inlet loss is determined from the measurements. At step 306, current available engine power of the rotorcraft engine is determined based on the at least one current inlet loss. At step 308, a visual indication of the current available engine power is produced via a flight display 230. The method 300 may be performed in response to an EPAC and/or may be performed continuously while the rotorcraft 50 is inflight.

In some embodiments, determining the at least one current inlet loss at step 304 comprises determining the at least one inlet loss based on the measurements obtained from the sensor(s) 220 and one or more engine and/or rotorcraft parameters. The engine parameters may comprise one or more of engine rotational speed, torque, inter-turbine temperature, engine power and/or any other suitable engine parameter(s). The rotorcraft parameters may comprise one or more of outside air temperature, ambient pressure, Mach number, and/or any other suitable rotorcraft parameter(s). The engine and/or aircraft parameters may be obtained from an engine and/or rotorcraft computer and/or from one or more sensors. The current inlet loss(es) determined at step 304 may comprise a current inlet temperature loss and/or a current inlet pressure loss.

In some embodiments, determining the inlet loss at step 304 comprises determining an inlet charge heating based on a difference between the measured inlet temperature and a reference atmospheric temperature. In other words, in some embodiments, the inlet temperature loss=T1−T0, where T1=the measured inlet temperature and T0=the free stream total temperature. The free stream total temperature may be determined based on the Mach number of the rotorcraft 50 and the outside air temperature.

In some embodiments, determining the inlet loss at step 304 comprises determining an inlet pressure loss based on a difference between the measured inlet pressure and a reference atmospheric pressure, where the difference is divided by the free stream total pressure. In other words, in some embodiments, the inlet pressure loss $dP/P=(P1-P0)/P0$, where $P1$=the measured inlet pressure and $P0$=the free stream total pressure. The free stream total pressure may be determined based on the Mach number of the rotorcraft 50 and the ambient pressure.

In some embodiments, determining the current available engine power at step 306 comprises determining the current available engine power based on the at least one current inlet loss determined at step 304 and at least one predetermined installation loss characteristic that depends on the configuration of the installation of the engine 10 in the rotorcraft 50. The predetermined installation loss characteristic(s) may comprise one or more of a predetermined inlet loss, a predetermined pressure loss, predetermined charge heating, a predetermined exhaust loss, and/or any other suitable predetermined installation loss characteristic(s). An installation loss characteristics calculation may be performed that adjusts one or more of the predetermined installation loss characteristics based on the current inlet losses determined at step 304. Adjusting a given predetermined installation loss characteristic may comprise offsetting the given predetermined installation loss characteristic by a certain value that is determined from the current inlet losses determined at step 304. The current available engine power may then be determined based on the adjusted installation loss characteristics.

Figure 4A:
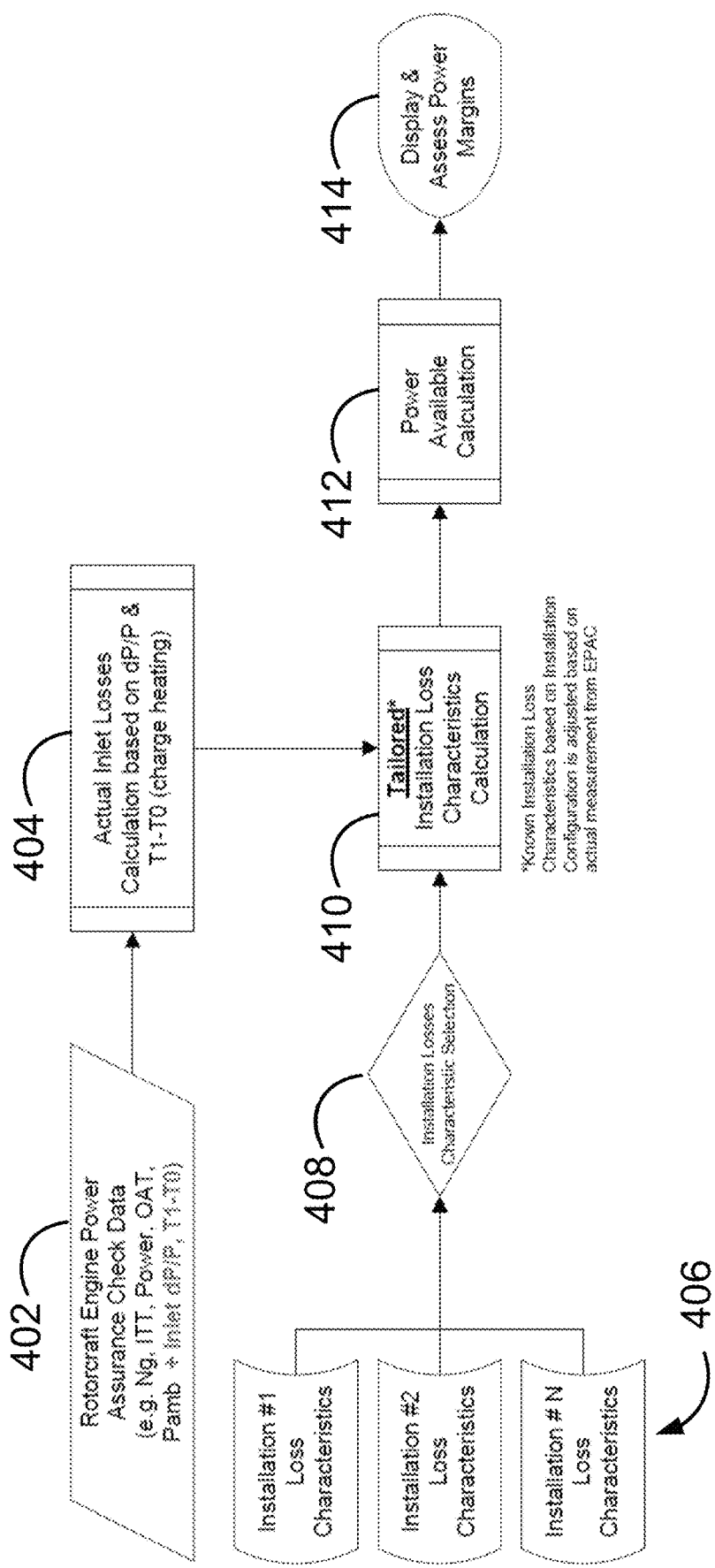
FIG. 4A is a block diagram of an example for operating a rotorcraft engine based on adjusting, from measurements, predetermined installation loss characteristics, in accordance with one or more embodiments.

By way of a specific and non-limiting example, FIG. 4A illustrates a block diagram for determining the current available engine power. As shown, at 404, current inlet losses are determined based on rotorcraft EPAC data 402. The rotorcraft EPAC data 402 comprises the engine and rotorcraft parameters, the inlet charge heating (T1−T0) and the inlet pressure loss dP/P. One or more predetermined installation loss characteristics 406 are selected at 408. At 410, an installation loss characteristics calculation adjusts the selected installation loss characteristics based on the inlet charge heating (T1−T0) and the inlet pressure loss dP/P. At 412, current available engine power is determined based on the adjusted predetermined installation loss characteristics. At 414, the current available engine power 414 is displayed.

Figure 4B:
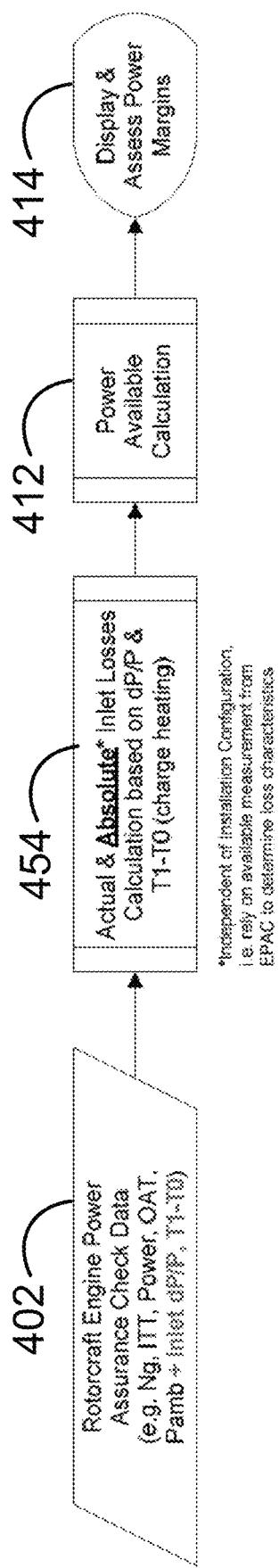
FIG. 4B is a block diagram of an example for operating a rotorcraft engine based on installation losses determined from measurements, in accordance with one or more embodiments.

Referring back to FIG. 3, in some embodiments, determining the current available engine power at step 306 comprises determining the current available engine power based on the at least one current inlet loss determined at step 304 and at least one of the engine and/or rotorcraft parameter, which may be obtained as part of an EPAC. By way of another specific and non-limiting example, FIG. 4B illustrates a block diagram for determining the current available engine power. As shown, at 454, current inlet losses are determined based on the rotorcraft EPAC data 402. At 412, current available engine power is determined based on inlet losses determined at 454. At 414, the current available engine power 414 is displayed.

Referring back to FIG. 3, the method 300 may be performed as part of an EPAC and/or in response to a request to perform an EPAC. An EPAC is generally performed for the purposes of monitoring the health of the engine 10. The EPAC may be initiated by an operator of the rotorcraft 50, by the control system 210 or by the rotorcraft computer 240. For instance, the EPAC may be automatically generated by the software of the control system 210 or the rotorcraft computer 240, while the rotorcraft 50 is inflight. An EPAC may be performed to output EPAC limits and/or margins (e.g., an inter-turbine temperature margin, an engine rotational speed margin and/or a first operating limit indicator indicative of the available power of the engine 10). In some embodiments, determining the current available engine power at step 306 comprises determining the EPAC limits and/or margins based on the current inlet losses. Accordingly, an inter-turbine temperature margin, an engine rotational speed margin and/or a first operating limit indicator indicative of the available power of the engine 10 may be determined based on the current inlet losses. In some embodiments, the current available engine power is determined at step 306 based on the EPAC limits and/or margins. The inter-turbine temperature margin, engine rotational speed margin and/or a first operating limit indicator may be determined by using one or more thermodynamic models of the engine 10 to which the current inlet losses are added thereto and a given model outputs the corresponding margin or limit. A signal indicative of the EPAC limits and/or margins (e.g., the inter-turbine temperature margin, the engine rotational speed margin and/or a first operating limit indicator) may be output to the flight display 230 and/or the rotorcraft computer 240 to cause EPAC limits and/or margins (e.g., the inter-turbine temperature margin, the engine rotational speed margin and/or a first operating limit indicator) to be displayed. By displaying one or more of the EPAC limits and/or margins determined based on the methods and/or systems described herein, this may enhance safety and pilot awareness.

In some embodiments, determining the current available engine power at step 306 comprises adjusting a calculated available engine power based on the current inlet losses determined at step 304. For example, the calculated available engine power may first be determined and then adjusted by the determined current inlet losses. Adjusting the calculated available engine power may comprise offsetting the calculated available engine power by a certain value that is determined from the current inlet losses determined at step 304. Adjusting the calculated available engine power may comprise offsetting the calculated available engine power by a certain value that is determined from the EPAC limits and/or margins.

In some embodiments, at step 304 one or more current exhaust losses are determined and the current available engine power is determined at step 306 based on the current inlet losses and the current exhaust losses. One or more sensors positioned inside the exhaust duct 18 may obtain measurements indicative of at least one of temperature and pressure at the exhaust duct 18. Accordingly, temperature and/or pressure measurements at the exhaust duct 18 may be obtained and used to determine the exhaust losses. The current exhaust loss(es) may comprise a current exhaust temperature loss and/or a current exhaust pressure loss.

FIG. 5A illustrates an EPAC limit 502 when predetermined losses are used and FIG. 5B illustrates EPAC limits 511, 512 when current losses as determined herein are used. An EPAC may be performed to assess the reduction of the engine and/or rotorcraft's inlet performance with time and the EPAC limit 502 corresponds to a limit that when exceeded indicates that rotorcraft inlet and/or engine maintenance/replacement is required. Referring to FIG. 5A, the two circles 1, 2 illustrate inlet loss measurements of a first and second inlet, respectively. The two inlets may have different inlet configurations or may be the same inlet configuration but with two different deterioration states (e.g., IBF clean vs blocked). The second inlet suggests a higher level of engine deterioration versus the first inlet, as $X-Y \geq 0$, where X and Y are the margins between the inlet loss measurements and the EPAC limit 502; however, in this example, this is mainly due to the different inlet configurations or different inlet deterioration states. As such, regardless of the current inlet loss, the EPAC limit 502 remains the same, as it is determined based on the worst case installation scenario. In contrast, FIG. 5B illustrates EPAC limits 511, 512 that are determined based on current inlet loss measurements. The two circles 1, 2 illustrated in FIG. 5B are the same inlet loss measurements of FIG. 5A. The EPAC limit 511 for the first inlet is determined based on the first inlet loss measurement 1, which has a margin Z1 to the EPAC limit 511. The EPAC limit 512 for the second inlet is determined based on the second inlet loss measurement 2, which has a margin Z2 to the EPAC limit 512. Regardless of the different inlet configurations, and assuming that the engine 10 did not deteriorate between EPACs, the margins Z1, Z2 to the respective EPAC limits 511, 512 generally remain the same, as Z1−Z2~0. If Z1 is not substantially equal to Z2, then actual engine deterioration may be determined based on the difference between Z1 and Z2. As the current available engine power deteriorates with use/wear of the engine 10 and the EPAC may be performed to determine when to replace the engine 10, the systems and/or methods described herein may allow for the engine 10 to remain on the rotorcraft 50 longer. It should be appreciated that the methods and/or systems described herein may reduce EPAC data scatter, which may allow for improved time that the engine 10 remains on the rotorcraft 50.

FIG. 6A illustrates the current available engine power 550 when predetermined losses are used and FIG. 6B illustrates the current available engine power 560 when actively determined losses are used. In FIG. 6A, the current available engine power 550 is limited by the maximum power 552 determined based on predetermined losses for the worst case installation scenario. In contrast, in FIG. 6B, the current available engine power 560 is determined based on the current inlet loss, which results in more available power compared to FIG. 6A. As shown in FIG. 6B, a gain 562 in current available engine power 560 between the maximum power 552 determined based on the worst case installation scenario and the maximum power 554 determined based on the best case installation scenario may be achieved. Thus, by using the systems and/or methods described herein this may result in more power available for flying the rotorcraft 50 and/or in enhanced safety and pilot awareness when flying the rotorcraft 50 in conditions that could rapidly deteriorate inlet losses (e.g., icing conditions, sand environment, etc.).

Figure 7:
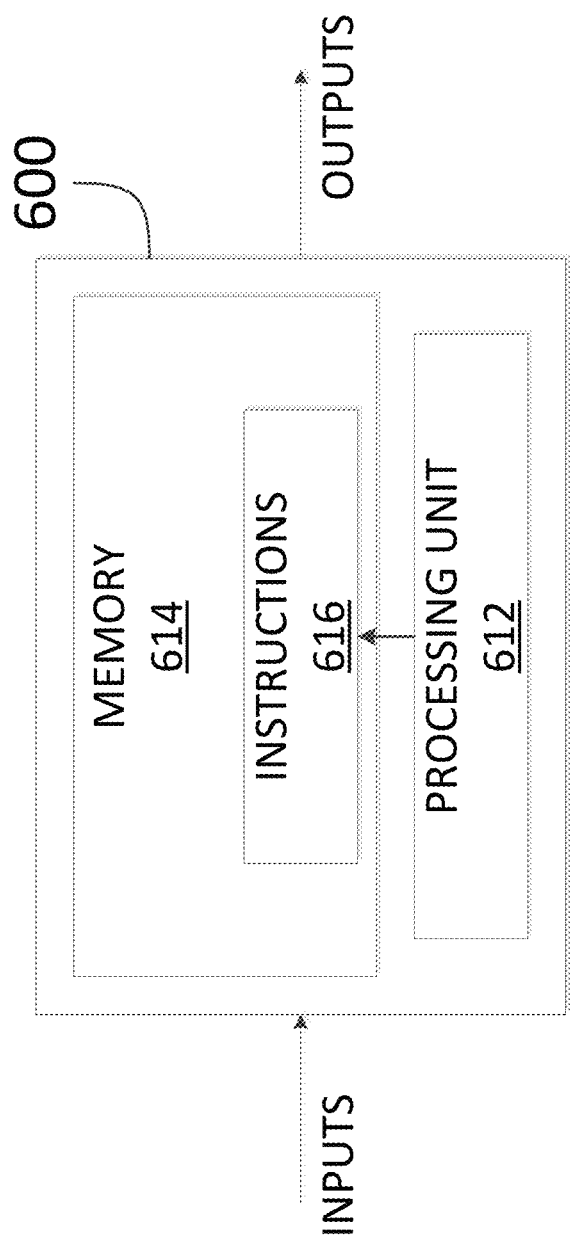
FIG. 7 is a block diagram of an example computing device for operating a rotorcraft engine, in accordance with one or more embodiments.

With reference to FIG. 7, an example of a computing device 600 is illustrated. The control system 210 and/or rotorcraft computer 240 may be implemented with one or more computing devices 600. Similarly, the method 300 may be implemented with the computing device 600. The computing device 600 comprises a processing unit 612 and a memory 614 which has stored therein computer-executable instructions 616. The processing unit 612 may comprise any suitable devices configured to implement the method 300 such that instructions 616, when executed by the computing device 600 or other programmable apparatus, may cause the functions/acts/steps performed as part of the method 300 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612. Note that the computing device 600 can be implemented as part of a full-authority digital engine controls (FADEC) or other similar device, including electronic engine control (EEC), engine control unit (ECU), electronic propeller control, propeller control unit, rotorcraft flight control computer, rotorcraft control avionic system and the like.

The methods and systems for determining available power of an engine described herein may be implemented in a high level procedural or object oriented programming or scripting language, or a combination thereof, to communicate with or assist in the operation of a computer system, for example the computing device 600. Alternatively, the methods and systems for determining available power of an engine may be implemented in assembly or machine language. The language may be a compiled or interpreted language. Program code for implementing the methods and systems for determining available power of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for determining available power of an engine may also be considered to be implemented by way of a non-transitory computer-readable storage medium having a computer program stored thereon. The computer program may comprise computer-readable instructions which cause a computer, or more specifically the processing unit 612 of the computing device 600, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for determining available power of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a rotorcraft engine, the method comprising:
    obtaining at least one predetermined installation loss characteristic that depends on a configuration of an installation of the engine in the rotorcraft;
    obtaining measurements indicative of at least one of current temperature and current pressure at an inlet of the engine from at least one sensor while the rotorcraft is in flight;
    determining at least one current inlet loss from the measurements;
    adjusting the at least one predetermined installation loss characteristic based on the at least one current inlet loss to obtain an adjusted at least one predetermined inlet loss characteristic;
    determining current available engine power of the rotorcraft engine based on the adjusted at least one predetermined inlet loss characteristic; and
    producing, via a flight display, a visual indication of the current available engine power.

2. The method of claim 1, wherein obtaining the measurements comprises obtaining a measured inlet temperature from at least one temperature sensor operatively coupled to the engine.

3. The method of claim 2, wherein determining the at least one current inlet loss comprises determining an inlet charge heating based on a difference between the measured inlet temperature and a total free stream temperature.

4. The method of claim 1, wherein obtaining the measurements comprises obtaining a measured inlet pressure from at least one pressure sensor operatively coupled to the engine.

5. The method of claim 4, wherein determining the at least one current inlet loss comprises determining an inlet pressure loss based on a difference between the measured engine inlet pressure and a free stream total pressure, the difference divided by the free stream total pressure.

6. The method of claim 1, wherein the current available engine power corresponds to a power margin indicative of a difference between a current output power of the engine and a maximum available output power of the engine.

7. The method of claim 1, wherein determining the current available engine power comprises determining the current available engine power based on the at least one current inlet loss and at least one engine parameter obtained as part of an engine power assurance check.

8. The method of claim 1, wherein the method is performed in response to a request for an engine power assurance check.

9. The method of claim 8, further comprising: determining, based on the at least one current inlet loss, at least one engine power assurance check limit or margin selected from the group consisting of an inter-turbine temperature margin, an engine rotational speed margin and a first operating limit indicator indicative of the current available power of the engine; and producing, via the flight display, a visual indication of the at least one engine power assurance check limit or margin.

10. The method of claim 1, wherein obtaining at least one predetermined installation loss characteristic comprises obtaining one or more of a predetermined inlet loss, a predetermined pressure loss, a predetermined charge heating, and a predetermined exhaust loss.

11. The method of claim 1, wherein adjusting the at least one predetermined installation loss characteristic based on the at least one current inlet loss comprises offsetting the at least one predetermined installation loss based on a value determined from the at least one current inlet loss.

12. A system for operating a rotorcraft engine, the system comprising:
    at least one processing unit; and
    at least one non-transitory computer-readable memory having stored thereon program instructions executable by the at least one processing unit for:
        obtaining at least one predetermined installation loss characteristic that depends on a configuration of an installation of the engine in the rotorcraft;
        obtaining measurements indicative of at least one of current temperature and current pressure at an inlet of the engine from at least one sensor while the rotorcraft is in flight;
        determining at least one current inlet loss from the measurements;
        adjusting the at least one predetermined installation loss characteristic based on the at least one current inlet loss to obtain an adjusted at least one predetermined inlet loss characteristic;
        determining current available engine power of the rotorcraft engine based on the adjusted at least one predetermined inlet loss characteristic; and
        producing, via a flight display, a visual indication of the current available engine power.

13. The system of claim 12, wherein obtaining the measurements comprises obtaining a measured inlet temperature from at least one temperature sensor operatively coupled to the engine.

14. The system of claim 13, wherein determining the at least one current inlet loss comprises determining an inlet charge heating based on a difference between the measured inlet temperature and a total free stream temperature.

15. The system of claim 12, wherein obtaining the measurements comprises obtaining a measured inlet pressure from at least one pressure sensor operatively coupled to the engine.

16. The system of claim 15, wherein determining the at least one current inlet loss comprises determining an inlet pressure loss based on a difference between the measured engine inlet pressure and a free stream total pressure, the difference divided by the free stream total pressure.

17. The system of claim 12, wherein the current available engine power corresponds to a power margin indicative of a difference between a current output power of the engine and a maximum available output power of the engine.

18. The system of claim 12, wherein determining the current available engine power comprises determining the current available engine power based on the at least one current inlet loss and at least one engine parameter obtained as part of an engine power assurance check.

19. The system of claim 12, wherein the program instructions are executed by the at least one processing unit in response to a request for an engine power assurance check.

20. The system of claim 19, wherein the program instructions are further executable by the at least one processing unit for: determining, based on the at least one current inlet loss, at least one engine power assurance check limit or margin selected from the group consisting of an inter-turbine temperature margin, an engine rotational speed margin and a first operating limit indicator indicative of the current available power of the engine; and producing, via the flight display, a visual indication of the at least one engine power assurance check limit or margin.

\* \* \* \* \*